US010891753B2

(12) United States Patent
Koskan et al.

(10) Patent No.: US 10,891,753 B2
(45) Date of Patent: Jan. 12, 2021

(54) DEVICE, SYSTEM AND METHOD FOR NOTIFYING A PERSON-OF-INTEREST OF THEIR LOCATION WITHIN AN ESTIMATED FIELD-OF-VIEW OF A CAMERA

(71) Applicant: MOTOROLA SOLUTIONS, INC.

(72) Inventors: Patrick D. Koskan, Jupiter, FL (US); Scott M. Alazraki, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/288,960

(22) Filed: Feb. 28, 2019

(65) Prior Publication Data
US 2020/0279390 A1 Sep. 3, 2020

(51) Int. Cl.
G06T 7/70 (2017.01)
G06K 7/10 (2006.01)
(Continued)

(52) U.S. Cl.
CPC ............ *G06T 7/70* (2017.01); *G06K 7/10366* (2013.01); *G06K 9/00369* (2013.01);
(Continued)

(58) Field of Classification Search
CPC .. G06T 7/70; G06K 7/10366; G06K 9/00369; G06K 9/00664; G06K 9/00791; G08B 7/00
(Continued)

(56) References Cited

U.S. PATENT DOCUMENTS 8,564,661 B2 10/2013 Lipton et al.
9,871,387 B1 * 1/2018 Bell .................. H02J 7/027
(Continued)

FOREIGN PATENT DOCUMENTS

WO WO-2016010442 A1 1/2016

OTHER PUBLICATIONS

Brekford Files Patent Application for Automated Detection of Electronic Distracted Driving Violations, Brekford Corp., May 19, 2016, downloaded from http://www.marketwired.com/printer_friendly?id=2126638.
(Continued)

Primary Examiner — Zaihan Jiang
(74) Attorney, Agent, or Firm — Perry + Currier, Inc.

(57) ABSTRACT

A device, system and method for notifying a person-of-interest of their location within an estimated field-of-view of a camera is provided. The device: identifies a person-of-interest in an area proximal one or more of a first camera and the device; receives and processes images from the first camera to identify a second camera located in the area; determines a location of the person-of-interest; and determines, from the images, a respective location and estimated field-of-view of the second camera; determines, by comparing the location of the person-of-interest and the respective location and estimated field-of-view of the second camera, whether the person-of-interest is located within the estimated field-of-view of the second camera; and, when the person-of-interest is located within the estimated field-of-view of the second camera, controls a notification device to provide a notification to notify the person-of-interest of their location within the estimated field-of-view of the second camera.

20 Claims, 5 Drawing Sheets

(51) Int. Cl.
*G06K 9/00* (2006.01)
*G08B 7/00* (2006.01)
*H04N 5/247* (2006.01)

(52) U.S. Cl.
CPC ..... *G06K 9/00664* (2013.01); *G06K 9/00791* (2013.01); *G08B 7/00* (2013.01); *G06K 9/00771* (2013.01); *G06T 2207/30196* (2013.01); *G06T 2207/30244* (2013.01); *H04N 5/247* (2013.01)

(58) Field of Classification Search
USPC ......................................... 348/143
See application file for complete search history.

(56) References Cited

U.S. PATENT DOCUMENTS

| | | | |
|---|---|---|---|
| 2011/0293094 A1* | 12/2011 | Os ........................ | H04L 9/0869 380/255 |
| 2014/0218544 A1 | 8/2014 | Senot et al. | |
| 2014/0347475 A1* | 11/2014 | Divakaran ......... | G06K 9/00771 348/135 |
| 2016/0127695 A1* | 5/2016 | Zhang ................... | H04N 7/185 348/143 |
| 2018/0101732 A1* | 4/2018 | Uchiyama .......... | G06K 9/00771 |
| 2018/0164103 A1* | 6/2018 | Hill ........................... | G01S 5/02 |
| 2018/0164809 A1* | 6/2018 | Moosaei ........... | B60W 60/0025 |
| 2018/0189763 A1* | 7/2018 | Olmstead ................. | G06K 9/52 |
| 2018/0350103 A1* | 12/2018 | Skidmore ................. | G06T 7/73 |
| 2018/0357247 A1* | 12/2018 | Siminoff .......... | G08B 13/19608 |
| 2019/0053012 A1* | 2/2019 | Hill ....................... | H04W 4/021 |
| 2019/0191098 A1* | 6/2019 | Ishii .................... | H04N 5/23299 |
| 2019/0266414 A1* | 8/2019 | Stawiszynski ......... | H04N 7/181 |
| 2019/0347518 A1* | 11/2019 | Shrestha ............ | G06K 9/00751 |

OTHER PUBLICATIONS

Drivers Using Mobile Phones Could be Even Knowing They've Been Caught, Apr. 12, 2018, downloaded from https://www.news.com.au/technology/innovation/motoring/hitech/drivers-using-mobile-phones-could-be-fined-without-even-knowing-theyve-been-caught/news-story/ecb141e8552b39560f7f395802e447d7.

Spy Hidden Camera Detector, downloaded from https://itunes.apple.com/us/app/spy-hidden-camera-detector/id925967783?platform=iphone&preserveScrollPosition=true#platform/iphone, Jan. 21, 2019.

* cited by examiner

DEVICE, SYSTEM AND METHOD FOR NOTIFYING A PERSON-OF-INTEREST OF THEIR LOCATION WITHIN AN ESTIMATED FIELD-OF-VIEW OF A CAMERA

BACKGROUND OF THE INVENTION

First responders, such as police officers, involved in incidents are often busy with the incident and may not be in a position to collect all available evidence for the incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
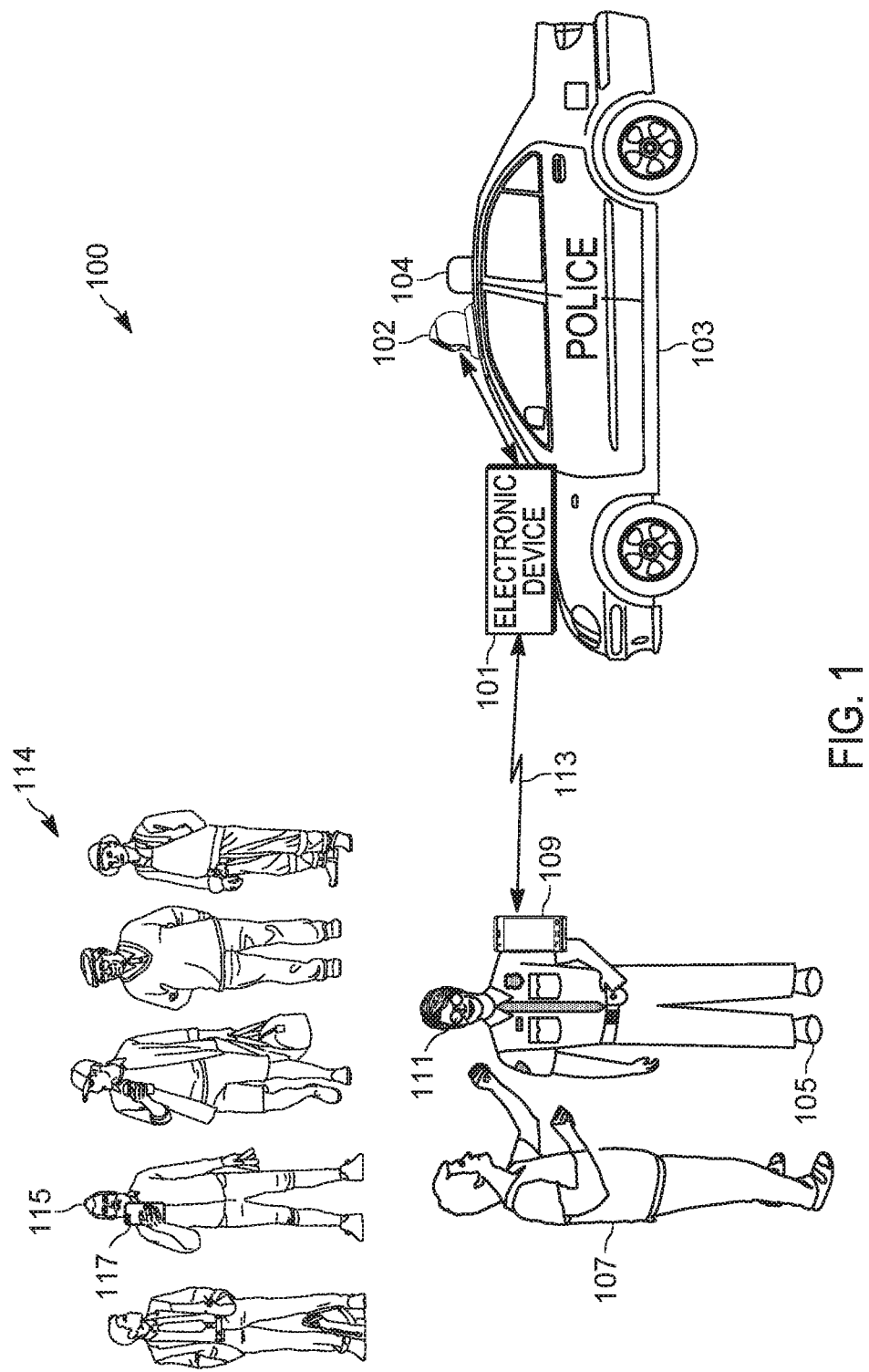
FIG. 1 is a system for notifying a person-of-interest of their location within an estimated field-of-view of a camera, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

First responders, such as police officers, involved in incidents are often busy with the incident and may not be in a position to collect all available evidence for the incident. While more than one first responder may be dispatched to an incident, with one of the responders dedicated to collecting evidence using cameras and the like, such collection of evidence can be inefficient and waste processing resources of the cameras and/or storage devices collecting evidence when the collected evidence is not pertinent to the incident and/or when the dedicated responder does not notice evidence for collection.

An aspect of the specification provides an electronic device comprising: a controller in communication with a first camera, the controller configured to: identify a person-of-interest in an area proximal one or more of the first camera and the electronic device; receive images from the first camera; process the images to identify a second camera located in the area proximal one or more of the first camera and the electronic device; determine a location of the person-of-interest; determine, from the images, a respective location and estimated field-of-view of the second camera; determine, by comparing the location of the person-of-interest and the respective location and estimated field-of-view of the second camera, whether the person-of-interest is located within the estimated field-of-view of the second camera; and, in response to determining that the person-of-interest is located within the estimated field-of-view of the second camera, control a notification device to provide a notification to notify the person-of-interest of their location within the estimated field-of-view of the second camera.

Another aspect of the specification provides a method comprising: identifying, at an electronic device in communication with a first camera, a person-of-interest in an area proximal one or more of the first camera and the electronic device; receiving, at the electronic device, images from the first camera; processing, at the electronic device, the images to identify a second camera located in the area proximal one or more of the first camera and the electronic device; determining, at the electronic device, a location of the person-of-interest; determining, at the electronic device, from the images, a respective location and estimated field-of-view of the second camera; determining, at the electronic device, by comparing the location of the person-of-interest and the respective location and estimated field-of-view of the second camera, whether the person-of-interest is located within the estimated field-of-view of the second camera; and, in response to determining that the person-of-interest is located within the estimated field-of-view of the second camera, controlling, at the electronic device, a notification device to provide a notification to notify the person-of-interest of their location within the estimated field-of-view of the second camera.

Attention is directed to FIG. 1, which depicts an example system 100 for notifying a person-of-interest of their location within an estimated field-of-view of a camera, in accordance with some examples. The system 100 comprises an electronic device 101 (interchangeably referred to hereafter as the device 101) for notifying a person-of-interest of their location within an estimated field-of-view of a camera. As depicted, the device 101 is in communication with a first camera 102, each of the device 101 and the first camera 102 being components of, and/or mounted to, a vehicle 103, such as a police vehicle (e.g. as depicted), a public-safety vehicle, and the like. However, while present examples are described with respect to first responders and/or public-safety personnel and/or public-safety vehicles, devices, systems and methods described herein may be applied to persons and/or vehicles that are not associated with first responders and/or public safety. Furthermore, while present examples are described with respect to the first camera 102 being mounted to the vehicle 103, the first camera 102 may alternatively be carried by a person and/or the first camera 102 may comprise a fixed camera. Similarly, while present examples are described with respect to the device 101 being a component of the vehicle 103 and/or local to the first camera 102, the device 101 may alternatively be carried by a person (e.g. the person carrying the first camera 102); and/or the device 101 and the first camera 102 may be remote from one another and in communication via a communication network (not depicted). For example, the first camera 102 may be located a scene of an incident, as described below, and the device 101 may comprise one or more cloud-computing devices and/or one or more servers, and the like, in communication with the first camera 102 via a communication network (not depicted).

In general, however, the first camera 102 comprises any suitable camera and/or combination of cameras configured to capture and/or acquire images in a field-of-view including, but not limited to, digital cameras, video cameras, stereoscopic cameras, and the like. Indeed, the first camera 102 may comprise two or more cameras mounted to the vehicle 103. Hence, the term "images" as used herein may include, but is not limited to, video, stereoscopic images and/or video, and the like. Furthermore, the first camera 102 may further include a microphone for capturing and/or acquiring audio such that images and/or video captured and/or acquired by the first camera 102 are optionally captured and/or acquired with audio.

As depicted, a person-of-interest 105 is located in an area proximal one or more of the first camera 102 and the electronic device 101. As depicted, the person-of-interest 105 is a police officer involved in an incident; for example, the person-of-interest 105 may be attempting to arrest a person 107 (e.g. as depicted who may be aggressively approaching the person-of-interest 105). However, the person-of-interest 105 and/or the person 107 and/or the incident involving the person-of-interest 105 and the person 107 may or may not be in the field-of-view of the first camera 102. However, the person-of-interest 105 may have been dispatched to attempt to arrest the person 107, and the device 101 may have access to an associated dispatch record and/or incident report indicating the person-of-interest 105 being dispatched.

As depicted in FIG. 1, the person-of-interest 105 is further wearing a mobile communication device 109 and smart glasses 111, each of which may comprise a notification device which may be controlled to provide audio notifications and/or visual notifications and/or haptic notifications, and the like, to the person-of-interest 105. Indeed, the device 101 and/or the vehicle 103 may also comprise one or more notification devices which may be controlled by the device 101 to provide audio notifications and/or visual notifications, and the like, to the person-of-interest 105; in these examples, the vehicle 103 may comprise a laptop computer (e.g. with a display screen and/or a speaker) and/or a speaker (such as a siren and/or bullhorn and the like) and/or lights 104 (e.g. as depicted a lightbar and the like, however lights of the vehicle 103 may include headlights, and the like) which may be controlled by the device 101 to provide audio notifications and/or visual notifications to the person-of-interest 105. Indeed, the device 101 may comprise a notification device and/or a laptop computer such that notifications described herein may be provided by the device 101 itself.

However, the system 100 may comprise any suitable combination of notification devices, for example as worn by the person-of-interest 105 and/or at the device 101 and/or at the vehicle 103, which may be controlled by the device 101 to provide notifications to the person-of-interest 105.

In some examples, the device 101, the mobile communication device 109 and the smart glasses 111 may form a personal area network (PAN) and/or a vehicle area network (VAN), with the device 101 and/or the mobile communication device 109 acting as a hub of the PAN and/or the VAN. For example, as depicted, the device 101 and the mobile communication device 109 are in communication via a wireless communication link 113.

Furthermore, the system 100, and/or a PAN and/or a VAN of the system 100, may comprise further devices worn by the person-of-interest 105 and/or mounted at the vehicle 103 and the like, which may enable the device 101 to identify the person-of-interest 105 and/or determine a location of the person-of-interest 105. For example, the person-of-interest 105 may be wearing a radio frequency identifier (RFID) device and the device 101 may comprise, and/or be in communication with, an RFID reader (e.g. via the VAN and/or located at the vehicle 103) which may read the RFID device of the person-of-interest 105. The information stored on the RFID device may identify the person-of-interest 105, for example, the information stored on the RFID device may comprise a badge number, and the like, of the person-of-interest 105.

Alternatively, the device 101 may be configured to determine a location of the person-of-interest 105 using one or more radio-frequency location determining processes including, but not limited to, range and bearing techniques (e.g. to determine a range and/or bearing of a radio of the mobile communication device 109, and/or an RFID device of the person-of-interest 105, which are understood to be co-located with the person-of-interest 105), triangulation techniques (e.g. to locate the mobile communication device 109 etc.) and the like. In some of these examples, a particular device (e.g. such as the mobile communication device 109, the smart glasses 111, a short-range Bluetooth worn by the person-of-interest 105, and the like), may be understood to be paired with the person-of-interest 105, the device 101 may receive a hardware address and/or a network address of the particular device (e.g. the address received from the particular device) which may be stored in a database and/or a memory accessible to the device 101 in combination with an identifier of the person-of-interest 105. Hence, receipt of such an address may be used by the device 10 to determine a location of the person-of-interest 105, for example in combination with triangulation and/or bearing and/or range techniques; for example, the device 101 may receive an address from a device worn by the person-of-interest 105 to determine that the person-of-interest 105 is nearby as identified using an accessible database, and then use triangulation and/or bearing and/or range techniques to determine a location of the device worn by the person-of-interest 105 from which the address was received; the location of the device worn by the person-of-interest 105 is used by the device 101 as the location of the person-of-interest 105.

Alternatively, the device 101 may determine the location of the person-of-interest 105 by receiving the location from any suitable location-determining device of the PAN and/or the VAN, for example, a Global Positioning System (GPS) of the mobile communication device 109 and/or the vehicle 103; in these examples, the location of the person-of-interest 105 may be received via the PAN and/or the VAN.

As depicted, while the person-of-interest 105 is involved in the incident with the person 107, a crowd 114 of bystanders are watching the incident. In particular, the crowd 114 includes an operating person 115 (e.g. one of the bystanders of the crowd 114) who is operating a second camera 117 to acquire images and/or video of the incident and/or the person-of-interest 105.

As depicted, the second camera 117 comprises a rear camera of a mobile communication device and/or a mobile phone of the operating person 115. However, the second camera 117 may comprise any suitable camera for acquiring images including, but not limited to, a dedicated camera device and/or a video device, including but not limited to a body-worn camera, a handheld camcorder, and the like.

In yet further examples, the second camera 117 may comprise a fixed camera, for example, a closed-circuit camera, mounted at a shop and/or business and/or at a pole, and the like, the fixed camera operated by, and/or managed by, an entity such as a business, and the like, and/or a public-safety entity, and the like.

In general, as described hereafter, the device 101 is configured to: determine whether the person-of-interest 105 is located within an estimated field-of-view of the second camera 117; and, in response to determining that the person-of-interest 105 is located within the estimated field-of-view of the second camera 117, control a notification device (e.g. at the device 101 and/or at the vehicle 103 and/or worn by the person-of-interest 105 and/or any other suitable notification device) to provide a notification to notify the person-of-interest 105 of their location within the estimated field-of-view of the second camera 117.

Figure 2:
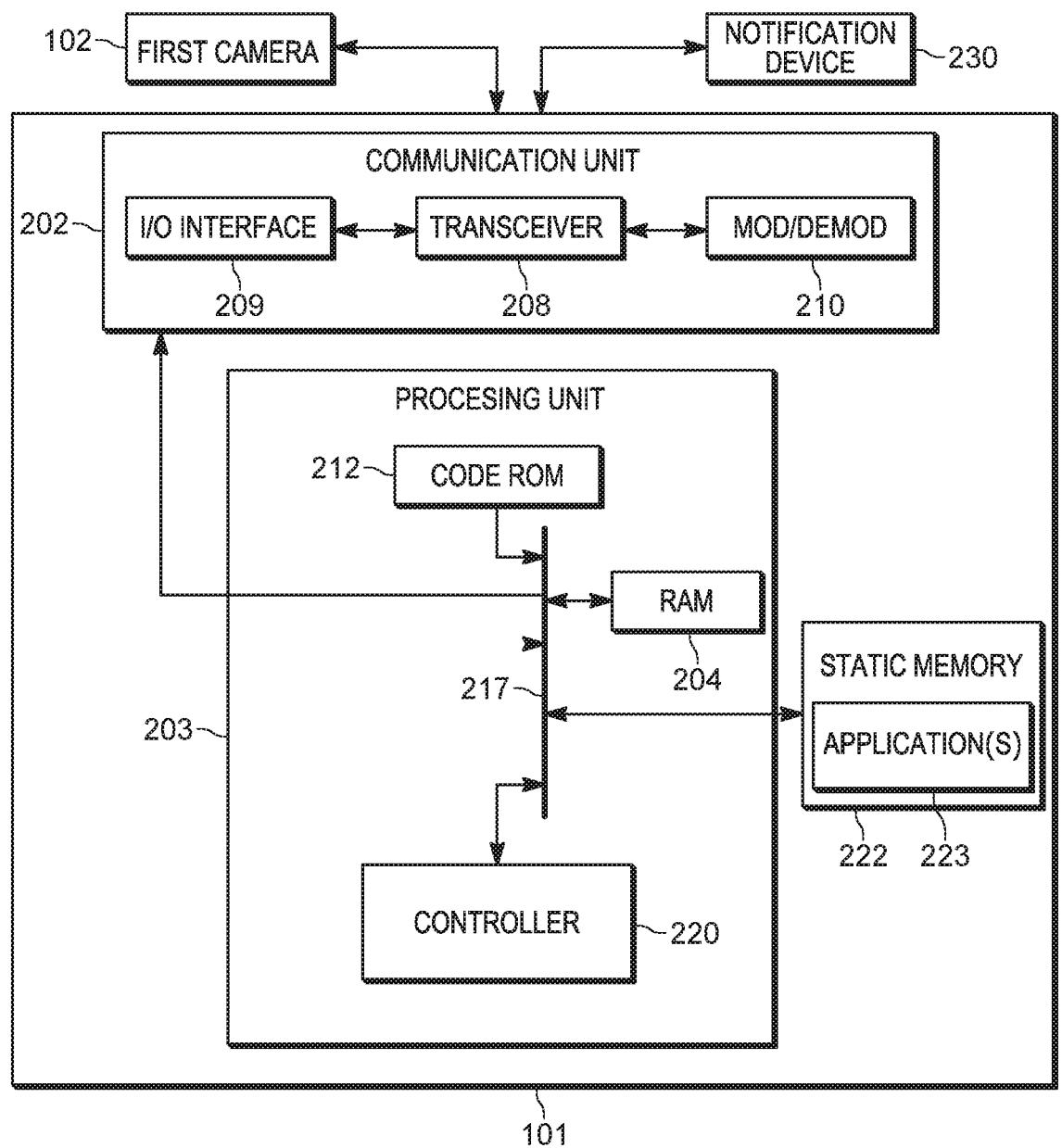
FIG. 2 is a device diagram showing a device structure of an electronic device for notifying a person-of-interest of their location within an estimated field-of-view of a camera, in accordance with some examples.

Attention is next directed to FIG. 2, which depicts a schematic block diagram of an example of the device 101.

In general, the device 101 may comprise one or more of a computing device, a server and/or a cloud-based computing device comprising: a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220 and a static memory 222 storing at least one application 223.

Hereafter, the at least one application 223 will be interchangeably referred to as the application 223. Furthermore, each of the memories 212, 222 comprise non-transitory memories and/or non-transitory computer readable mediums.

As depicted, the device 101 is in communication with the first camera 102, and a notification device 230 which may be local to the device 101 (e.g. when the device 101 is located at the vehicle 103), such as a speaker and/or a light of the vehicle 103. Alternatively, one or more of the first camera 102, and the notification device 230 may be integrated with the device 101.

While not depicted, the device 101 may also include one or more of a speaker, a microphone, an input device, a display screen, and the like, and/or any other suitable components for human-machine interactions with the device 101.

In yet further examples, the device 101 may include a location determining device, such as a GPS device, and the like, for example to determine a location of the device 101. Alternatively, when the device 101 is not co-located with the first camera 102, the device 101 may be configured to determine a location of the first camera 102, for example by receiving a location of the first camera 102 from the vehicle 103 and/or the first camera 102. Regardless, the device 101 may be generally configured to determine a location of the device 101 and/or the first camera 102.

As shown in FIG. 2, the device 101 includes the communications unit 202 coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with corresponding communication units at the mobile communication device 109, the smart glasses 111 via the link 113, and the like, as well as the first camera 102 and/or the notification device 230 when located external to the device 101. For example, the communication unit 202 may include one or more transceivers 208 and/or wireless transceivers for communicating with at the mobile communication device 109, the smart glasses 111, via the link 113, and the like, as well as the first camera 102 and/or the notification device 230 when located external to the device 101. For example, components of the system 100 may be configured to communicate via one or more of a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network including, but not limited to, an Ultra-Wide Band (UWB) network (which can be used for RF triangulation in determining a location of the person-of-interest 105). Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, a UWB transceiver, and/or another similar type of wireless transceiver configurable to communicate via a wireless radio network.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. the first camera device 102, the notification device 230, and the like). Indeed, as depicted, one or more of the first camera device 102, the notification device 230 may be located external to the device 101 and in communication with the device 101 via such ports. Alternatively, when the device 101 comprises a cloud-computing device, and the like, the first camera device 102, the notification device 230 may be located remote from the device 101 and in communication with the device 101 via the communication unit 202.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for notifying a person-of-interest of their location within an estimated field-of-view of a camera. For example, in some examples, the device 101 and/or the controller 220 specifically comprises a computer executable engine configured to implement functionality for notifying a person-of-interest of their location within an estimated field-of-view of a camera.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220, which makes appropriate utilization of volatile storage during the execution of such programming instructions.

Figure 3:
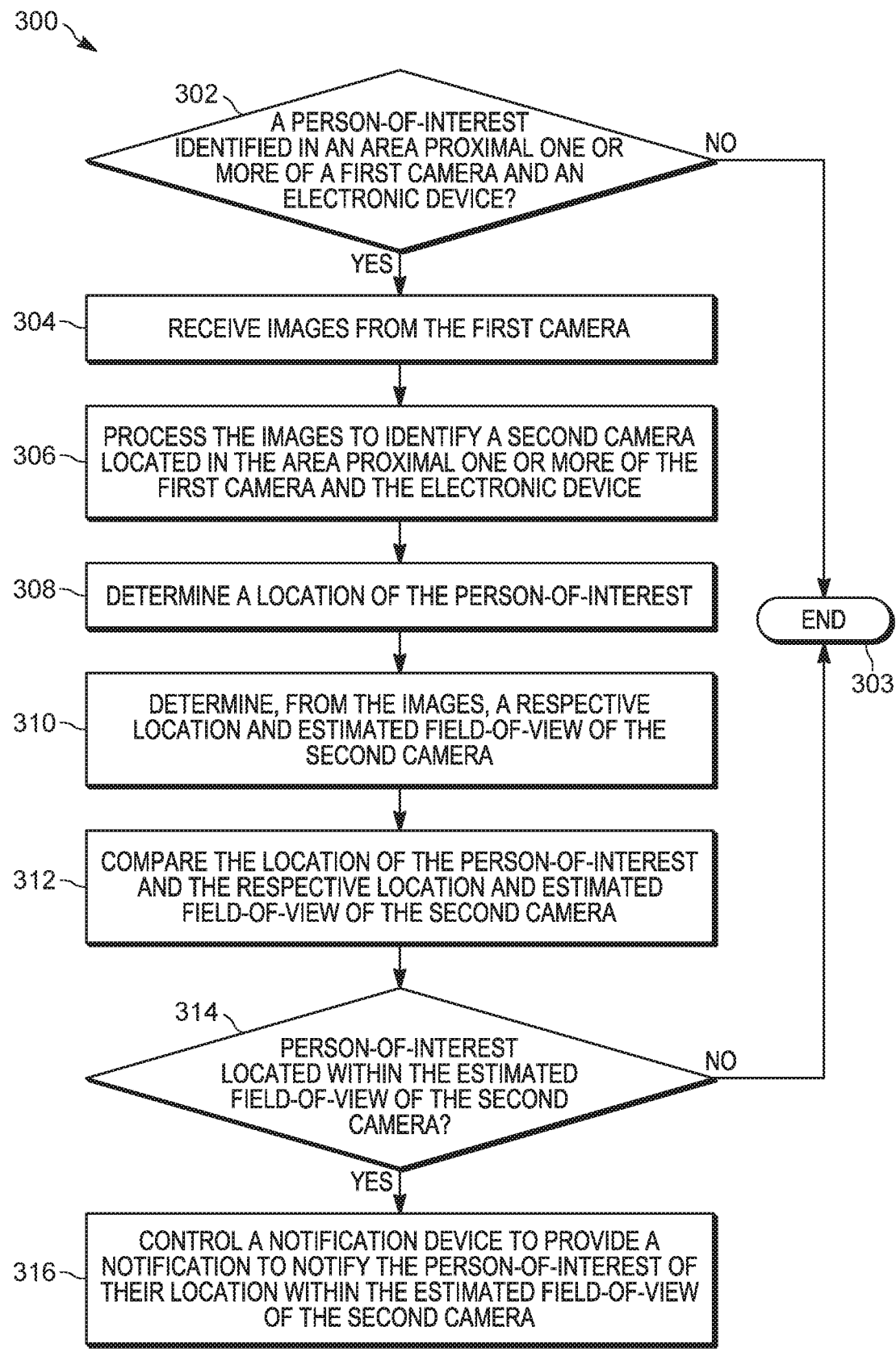
FIG. 3 is a flowchart of a method for notifying a person-of-interest of their location within an estimated field-of-view of a camera, in accordance with some examples.

In particular, the memory 222 stores instructions corresponding to the at least one application 223 that, when executed by the controller 220, enables the controller 220 to implement functionality for notifying a person-of-interest of their location within an estimated field-of-view of a camera including, but not limited to, the blocks of the method set forth in FIG. 3. In illustrated examples, when the controller 220 executes the one or more applications 223, the controller 220 is enabled to: identify the person-of-interest 105 in an area proximal one or more of the first camera 102 and the electronic device 101; receive images from the first camera 102; process the images to identify the second camera 117 located in the area proximal one or more of the first camera 102 and the electronic device 101; determine a location of the person-of-interest 105; determine, from the images, a respective location and estimated field-of-view of the second camera 117; determine, by comparing the location of the person-of-interest 105 and the respective location and estimated field-of-view of the second camera 117, whether the person-of-interest 105 is located within the estimated field-of-view of the second camera 117; and, in response to determining that the person-of-interest 105 is located within the estimated field-of-view of the second camera 117, control a notification device to provide a notification to notify the person-of-interest 105 of their location within the estimated field-of-view of the second camera 117.

The application 223 may include one or more of: machine learning algorithms; deep-learning algorithms; video analytic algorithms; three-dimensional video analytic algorithms; contextual incident information; trained video analytic classifiers, and the like. Such algorithms may be trained to determine, by comparing the location of the person-of-interest 105 and the respective location and estimated field-of-view of the second camera 117, whether the person-of-interest 105 is located within the estimated field-of-view of the second camera 117. For example, the application 223 may be trained to identify cameras in images, types and/or makes and/or models of cameras in images, a direction that a camera is pointing in images, operating persons operating cameras in images, and the like. Similarly, the application 223 may be trained to identify persons-of-interest in images including, but not limited to, first responders in uniforms, and the like. Indeed, in some examples, the application 223 may comprise and/or have access to (e.g. as stored in the memory 222), trained video analytic classifiers corresponding to one or more of: cameras, types and/or makes and/or models of cameras, directions that a camera is pointing, operating persons operating cameras, persons-of-interest, first responders in uniforms, and the like.

The one or more machine learning algorithms and/or deep learning algorithms of the application 223 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. However, any suitable machine learning algorithm and/or deep learning algorithm is within the scope of present examples.

While details of the mobile communication device 109 and the smart glasses 111 are not depicted, each of the mobile communication device 109 and the smart glasses 111 may have components similar to the device 101 adapted, however, for the functionality of the mobile communication device 109 and the smart glasses 111; for example, each of the mobile communication device 109 and the smart glasses 111 may have a communication unit, controller and the like adapted to communicate with the device 101 and/or each other. However, a respective application stored at a respective memory of the mobile communication device 109 and the smart glasses 111 is generally adapted to provide the functionality of the mobile communication device 109 and the smart glasses 111 when implemented by a respective controller.

Attention is now directed to FIG. 3, which depicts a flowchart representative of a method 300 for notifying a person-of-interest of their location within an estimated field-of-view of a camera. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 determines whether a person-of-interest 105 is identified in an area proximal one or more of the first camera 102 and the electronic device 101. In some examples the controller 220 may identify whether the person-of-interest 105 is in the area proximal one or more of the first camera 102 and the electronic device 101 from images (and/or audio) received from the first camera 102. Indeed, in the controller 220 may determine whether the person-of-interest 105 is identified using one or more of: facial recognition to match known persons-of-interest; machine learning models; known identifiers received from RFID devices worn by known persons-of-interest; radio identifiers received over-the-air from radios (e.g. such as the mobile communication device 109) associated with known persons-of-interest; classifiers that match badges, uniforms, hats, and the like associated with known persons-of-interest; and the like. Indeed, persons-of-interest 105 may be identified further using a database that identifies specific identifiers of persons-of-interest.

However, in other examples the person-of-interest 105 may not be in a field-of-view of the first camera 102. In some of these examples, the controller 220 and/or the device 101 may receive and/or have access to an incident report and/or a dispatch record which indicates that the person-of-interest 105 has been dispatched to an incident in the area proximal one or more of the first camera 102 and the electronic device 101. Furthermore, in these examples, the controller 220 has access to the location of the device 101 and/or the first camera 102 and hence may determine, by comparing the location of the device 101 and/or the first camera 102 and the incident report, that the incident is occurring in the area proximal one or more of the first camera 102 and the electronic device 101, for example on the assumption that the person-of-interest 105 is responding to the incident and that the person-of-interest 105 is hence in the area proximal one or more of the first camera 102 and the electronic device 101.

In yet further examples, the controller 220 may identify the person-of-interest 105 in the area proximal one or more of the first camera 102 and the electronic device 101 by receiving, from an RFID device and the like worn by the person-of-interest 105, an identifier of the person-of-interest 105. As RFID devices have limited broadcast range and/or are near-field communication (NFC) devices, receipt of an identifier of the person-of-interest 105 from an RFID device indicates that the person-of-interest 105 in the area proximal one or more of the first camera 102 and the electronic device 101 (e.g. in these examples, the device 101 comprises an RFID reader and is co-located with the first camera 102 and/or the first camera 102 comprises an RFID reader and/or is the vehicle 103 comprises an RFID reader in communication with the controller 220).

In some examples, the controller 220 may whether a person-of-interest 105 is identified in an area proximal one or more of the first camera 102 by determining whether the person-of-interest 105 is associated with a current incident. For example, as described above, the controller 220 and/or the device 101 may receive and/or have access to an incident report and/or a dispatch record which indicates that the person-of-interest 105 has been dispatched to an incident in the area proximal one or more of the first camera 102 and the electronic device 101. Alternatively, the controller 220 may determine whether the person-of-interest 105 is associated with a current incident from images (and/or audio) received from the first camera 102. Hence, in some examples, the block 304 may be combined with the block 302, and/or the block 302 and the block 304 may be implemented in any suitable order.

When the controller 220 determines that a person-of-interest 105 is not identified in an area proximal one or more of the first camera 102 and the electronic device 101 (e.g. a "NO" decision at the block 302) the method 300 may end at the block 303 and/or the method 300 may repeat from the block 302.

However, in response to the controller 220 determining that a person-of-interest 105 is identified in an area proximal one or more of the first camera 102 and the electronic device 101 (e.g. a "YES" decision at the block 302) the controller 220 may enter a mode, and/or cause the first camera 102 to enter a mode, to detect whether the POI 103 is within an estimated field-of-view of a camera; in some examples, such a mode may be referred to an as Integrated Vehicle Assistant (IVA) mode.

As depicted, in response to the controller 220 determining that a person-of-interest 105 is identified in an area proximal one or more of the first camera 102 and the electronic device 101 (e.g. a "YES" decision at the block 302), at a block 304 the controller 220 receives images from the first camera 102. However, as the controller 220 may be receiving images from the first camera 102 prior to the block 304 (e.g. to determine whether the person-of-interest 105 is in an area proximal one or more of the first camera 102 and the electronic device 101), the block 304 may be combined with the block 302, 304, and/or the blocks 302, 304,304 may be implemented in any suitable order.

At the block 306, the controller 220 processes the images to identify the second camera 117 located in the area proximal one or more of the first camera 102 and the electronic device 101, for example using machine learning algorithms (e.g. on sample images of camera devices), video analytics (e.g. using object detection and/or image comparison tools to match stored images of known cameras with cameras in captured images), and the like, as described above.

At the block 306 the controller 220 may further determine one or more of: whether the second camera 117 is being held by the operating person 115; and/or a type (e.g. make and/or model) of the second camera 117, and the like. In some of these examples, where the second camera 117 is being held by the operating person 115, the controller 220 may further identify data associated with the operating person 115 including, but not limited to, a description of the operating person 115 (e.g. estimated gender, clothing, hair color, height, facial recognition and the like).

At a block 308, the controller 220 determines a location of the person-of-interest 105.

In some examples, the controller 220 may determine a location of the person-of-interest 105 by: determining the location of the person-of-interest 105 from the images received from the first camera 102, as described above.

In other examples, the controller 220 may determine a location of the person-of-interest 105 by: receiving the location of the person-of-interest 105 from a location-determining device associated with the person-of-interest. For example, the mobile communication device 109 may comprise a location-determining device (e.g. a GPS device and the like) and transmit a location of the mobile communication device 109 (and hence the person-of-interest 105) to the controller 220 and/or the device 101 as determined from the location-determining device. Hence, in some of these examples, the controller 220 may determine a location of the person-of-interest 105 by: receiving the location of the person-of-interest 105 from a GPS device associated with the person-of-interest 105.

In other examples, the controller 220 may determine a location of the person-of-interest 105 by: determining the location of the person-of-interest 105 using one or more radio-frequency location determining processes, including, but not limited to, triangulation (e.g. by communicating with network devices that are in turn communicating with and/or pinging the mobile communication device 109), and range and/or bearing techniques (e.g. to determine whether the mobile communication device 109 and/or an RFID device of the person-of-interest 105 is within a given range and/or to determine a bearing of the mobile communication device 109 and/or an RFID device of the person-of-interest 105).

In yet further examples, the controller 220 may determine a location of the person-of-interest 105 by: determining the location of the person-of-interest 105 using an RFID tracking device associated with the person-of-interest 105, which may include using the aforementioned range and/or bearing techniques.

In yet further examples the controller 220 may determine a location of the person-of-interest 105 using any suitable combination of one or more of the aforementioned techniques and/or any other suitable technique.

At a block 310, the controller 220 determines, from the images received from the first camera 102, a respective location and estimated field-of-view of the second camera 117 using machine learning algorithms, video analytics techniques and the like. In some examples, the first camera 102 may comprise a stereoscopic camera and stereoscopic and/or three-dimensional video analytic techniques may be used to determine the location of the second camera 117. In yet further examples, device 101 may be in communication with other devices (e.g. at the vehicle 103) which may assist the device 101 and/or the controller 220 in determining a respective location and estimated field-of-view of the second camera 117, and/or the first camera 102 may comprise such devices. Devices that may assist the device 101 and/or the controller 220 in determining a respective location and estimated field-of-view of the second camera 117 include, but are not limited to, a depth camera a time-of-flight camera, a radar device and the like. Such devices may further be used to assist the device in determining the location of the person-of-interest 105 at the block 308. In some specific examples, the first camera 102 may include both a raster and/or two-dimensional imager and a depth camera.

The estimated field-of-view of the second camera 117 may be determined using an average camera field-of-view preconfigured at the application 223 and/or stored in the memory 222. For example, many cameras have a field-of-view in a range of 110° to 120°, and hence the field-of-view of the second camera 117 may be estimated to be in this range, for example 115°.

Alternatively, the controller 220 may be configured to: identify, from the images from the first camera 102, a type the second camera 117, including, but not limited to a make and/or model of the second camera 117, and the like; and determine, from the type of the second camera 117, the estimated field-of-view of the second camera 117. For example, the controller 220 may have access to data and/or a database indicating fields-of-view of different types and/or makes and/or models of cameras and, from the type of the second camera 117 determined by the controller 220, retrieve the estimated field-of-view from the data and/or database.

At a block 312, the controller 220 compares the location of the person-of-interest 105 and the respective location and the estimated field-of-view of the second camera 117 to determine whether the person-of-interest 105 is located within the estimated field-of-view of the second camera 117.

For example, the controller 220 may be configured to determine whether the person-of-interest 105 is located within the estimated field-of-view of the second camera 117 by: determining, from the images from the first camera 102, an orientation of the second camera 117 with respect to the location of the person-of-interest 105; and determining that the orientation of the second camera 117 is towards the person-of-interest 105. Such a determination may occur using machine learning algorithms, video analytics and the like.

In particular, for example the estimated field-of-view of the second camera 117 may be mathematically projected and/or extrapolated from the location of the second camera 117, and the controller 220 may determine whether the location of the person-of-interest 105 is within the estimated field-of-view of the second camera 117 as mathematically projected and/or extrapolated from the location of the second camera 117.

At a block 314, when the person-of-interest 105 is not located within the estimated field-of-view of the second camera 117 (e.g. a "NO" decision at the block 314) the method 300 may end at the block 303 and/or the method 300 may repeat from the block 302.

However, in response to determining that the person-of-interest 105 is located within the estimated field-of-view of the second camera 117 (e.g. a "YES" decision at the block 314), at a block 316, the controller 220, controls a notification device to provide a notification to notify the person-of-interest 105 of their location within the estimated field-of-view of the second camera 117.

For example, when the device 101 comprises a notification device and/or is in communication with a notification device at the vehicle 103, and the like, the controller 220 may be further configured to control the notification device to provide the notification at the block 316 by: locally controlling the notification device to provide one or more of an audio notification and a visual notification to the person-of-interest 105. For example, a speaker and/or lights of the vehicle 103, and/or a laptop computer, and the like, at the vehicle 103, may be controlled to provide an audio notification (e.g. an aural announcement and/or an aural pattern emitted by a siren, and the like) and/or a visual notification (e.g. a visual pattern emitted by lights at the vehicle 103) indicative that the person-of-interest 105 is located within an estimated field-of-view of a camera.

Alternatively, and/or in addition to providing notifications at a notification device local to the device 101, when the device 101 comprises the communication unit 202, and a notification device is located with the person-of-interest 105 (e.g. at the mobile communication device 109 and/or at the smart glasses 111), the controller 220 may be further configured to control the notification device located with the person-of-interest 105 to provide the notification at the block 316 by: transmitting, using the communication unit 202, a command to the notification device located with the person-of-interest 105 to provide the notification. In some examples, the device 101 may that identify notification device is located with the person-of-interest 105 using a database and/or memory storing a person-of-interest to associated communication device and/or notification device mapping. In some examples, the device 101 may that identify notification device is located with the person-of-interest 105 via a detected over-the-air identifier (network address, hardware address, or RFID identifier), and/or via a prior short-range (e.g. Bluetooth™) pairing of the mobile communication device 109 with the device 101 (and/or a pairing with another vehicle device in communication with the device 101). The command may be transmitted to notification device located with the person-of-interest 105 via a direct mode and/or ad-hoc network, and/or indirectly via an infrastructure network.

Such a notification may comprise an audio notification, a visual notification and/or a haptic notification. In particular examples, the smart glasses 111 may be controlled to provide text and/or an icon and/or graphics, and the like indicative that the person-of-interest 105 is located within an estimated field-of-view of a camera.

In some examples, the notification of the block 316 may include, but is not limited to, text and/or an icon and/or graphics, and the like indicative of a direction of the second cameral 17 with respect to the location of the person-of-interest 105 (e.g. 3 o'clock, southwest, and the like).

Regardless of the location of the notification device which provides the notification of the block 316, the person of interest 105 is notified of the presence of the second camera 117. In some examples, such a notification may cause the person of interest to ensure that procedure for interacting with the person 107 and/or in the incident is properly followed. Indeed, in some examples, the controller 220 may identify the type of incident and a notification provided at the smart glasses 111, and the like, may access a database, as a function of the type of incident, and retrieve procedures associated with the type of incident and provide the procedures accompanying or before or after the notification.

However, determining that the person-of-interest 105 is located within the estimated field-of-view of the second camera 117 (e.g. a "YES" decision at the block 314) may also cause the controller 220 to collect and store further data associated with the incident.

For example, the controller 220 may be further configured to, in response to determining that the person-of-interest 105 is located within the estimated field-of-view of the second camera 117 (e.g. a "YES" decision at the block 314): store, in a memory in communication with the controller 220, one or more of: the images received at the block 304; data associated with one or more of the images and the second camera 117; and metadata associated with one or more of the images and the second camera 117.

Alternatively, the controller 220 may be further configured to: determine, from the images received at the block 304, that the operating person 115 is operating the second camera 117; and, in response to determining that the person-of-interest 105 is located within the estimated field-of-view of the second camera 117: store, in a memory in communication with the controller 220, one or more of: the images; data associated with the operating person; and metadata associated with the operating person.

Indeed, the controller 220 may be configured to store data and/or metadata associated with the second camera 117 and/or the operating person 115, for example at the memory 222 and/or as transmitted to a memory of a cloud computing device, such as a memory of an evidence management system (EMS) and the like. Such data and/or metadata may include, but is not limited to, a time and/or location that the images were acquired; any of the data and/or metadata determined at the blocks of the method 300, as described above; a description of the operating person 115 and/or the second camera 117; a type of machine learning algorithm used in the method 300; and the like. Indeed, the images and/or data and/or metadata stored in the memory 222 and/or uploaded to an EMS, and the like, may be used to locate and/or identify the operating person 115 and/or the second camera 117 to obtain evidence of the incident in which the person-of-interest 105 is involved. For example, the images and/or data and/or metadata stored in the memory 222 and/or uploaded to an EMS may be used to locate the operating person 115 such that images from the second camera 117 may be requested as evidence for the incident. Similarly, the images and/or data and/or metadata stored in the memory 222 and/or uploaded to an EMS may be used to locate the second camera 117 and/or an entity managing the second camera 117 (e.g. when the second camera is a fixed position and/or a closed-circuit camera) such that images from the second camera 117 may be requested as evidence for the incident. In some examples the metadata associated with the second camera 117 may include, but is not limited to, captured over-the-air hardware and/or network addresses and/or radio identifiers which may later aid in identifying the second camera 117 and/or the operating person 115; in other words, a radio located with the device 101 may receive, over-the-air, hardware and/or network addresses and/or radio identifiers of the second camera 117.

From the above description of the method 300, it is understood that the block 304 may be used to cause the remainder of the method 300 to be implemented. In particular, the controller 220 may be further configured to: determine whether the person-of-interest 105 is associated with a current incident, and determining whether the person-of-interest 105 is located within the estimated field-of-view of the second camera 117, and controlling a notification device, in response to determining that the person-of-interest 105 is located within the estimated field-of-view of the second camera 117, occur in response to determining that the person-of-interest 105 is associated with the current incident.

Similarly, from the above description of the method 300, it is understood that the controller 220 may be further configured to identify, from the images, one or more of the person-of-interest 105, the second camera 117, the operating person 115 of the second camera 117, and whether the person-of-interest 105 is located within the estimated field-of-view of the second camera 117, using one or more of: machine learning algorithms; video analytic algorithms; three-dimensional video analytic algorithms; contextual incident information (e.g. from an incident report and/or a dispatch report); trained video analytic classifiers, as described above. However, machine learning algorithms, video analytic algorithms, three-dimensional video analytic algorithms, contextual incident information, trained video analytic classifiers may be used to implement any suitable block of the method 300.

In yet further examples, the controller 220 may be further configured to: determine, from the images from the first camera 102 (as received, for example, at the block 304), that an operating person is operating a communication device to capture information associated with the person-of-interest 105, the information comprising one or more of textual information and voice information; and store, in a memory, one or more of: an indication of the information being captured; and data identifying the operating person.

For example, the images received from the images from the first camera 102 may show another bystander of the crowd 114 who is watching the incident involving the person-of-interest 105 and using their mobile communication device to type and/or verbally dictate (e.g. using a voice-to-text application and/or a voice recording application) information which may be related to the incident. For example, such a bystander (e.g. an operating person) who may be the same as, or different from, the operating person 115, may be blogging and/or emailing and/or tweeting, and/or otherwise capturing textual and/or aural information, and the like about the incident. The controller 220 may hence store, in a memory (e.g. the memory 222 and/or a memory of an EMS), one or more of: an indication of the information being captured; and data (including, but not limited to metadata) identifying such an operating person. For example, data identifying such an operating person may be stored in association with an indication that the identified person was typing and/or speaking into their mobile communication device and may hence be used to later contact the person to obtain the data captured by the person as evidence for the incident.

Figure 4:
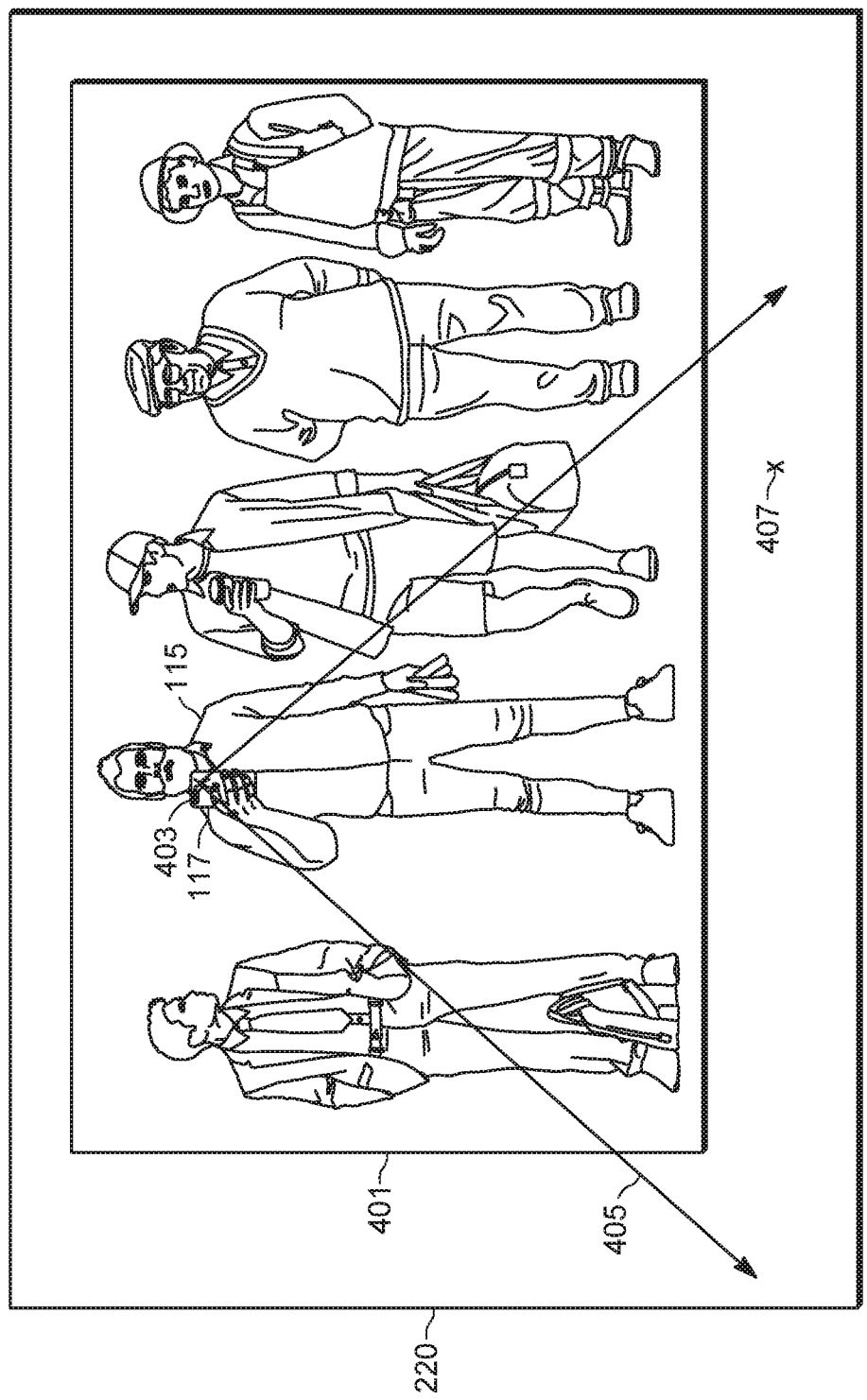
FIG. 4 depicts a controller of the electronic device of FIG. 2 processing an image from a first camera in communication with the electronic device and determining that a person-of-interest is located within an estimated field-of-view of a second camera identified in the image, in accordance with some examples.
Figure 5:
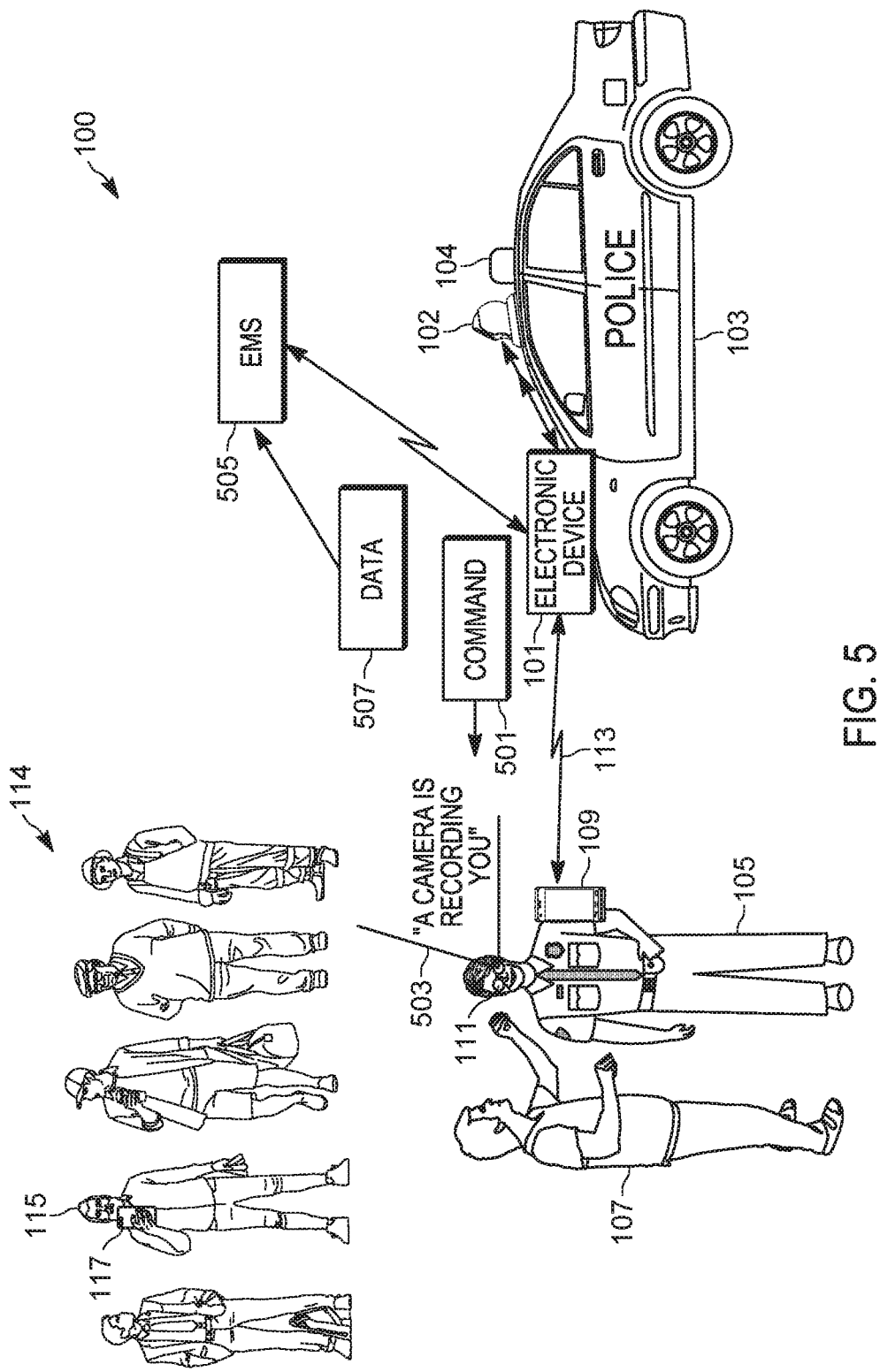
FIG. 5 depicts the system of FIG. 1, in which a notification device is controlled to provide a notification to notify the person-of-interest of their location within the estimated field-of-view of the second camera, the notification occurring in response to determining that the person-of-interest is located within the estimated field-of-view of the second camera, in accordance with some examples.

Attention is next directed to FIG. 4 and FIG. 5 which depicts an example of the method 300.

In particular FIG. 4 depicts the controller 220 of the device 101 processing an image 401 from the first camera 102 which includes the operating person 115 operating the second camera 117. As depicted, the controller 220 has further determined a location 403 and an estimated field-of-view 405 of the second camera 117 as well as determined a location 407 of the person-of-interest 105. As the image 401 does not include the person-of-interest 105, the location 407 is determined by one or more of: a location-determining device associated with the person-of-interest 105; a GPS device associated with the person-of-interest 105; one or more radio-frequency location determining processes; an RFID tracking device associated with the person-of-interest 105; and the like.

As depicted in FIG. 4, the controller 220 has further determined that the person-of-interest 105 is located within the estimated field-of-view 405 of the second camera 117, as the location 407 is within the estimated field-of-view 405 of the second camera 117, as mathematically projected from the location 403 of the second camera 117. Hence, FIG. 4 depicts the controller 220 implementing at least block 304, block 306, block 308, block 310, block 312 and block 314 (e.g. a "YES" decision occurs at the block 314) of the method 300.

Attention is next directed to FIG. 5 which is substantially similar to FIG. 1 with like components having like numbers. In particular, FIG. 5 depicts an example of the block 316 of the method 300 in which the controller 220 of the device 101 has determined that the person-of-interest 105 is located within the estimated field-of-view 415 of the second camera 117, as depicted in FIG. 4.

FIG. 5 further depicts the device 101, in response to determining that the person-of-interest 105 is located within the estimated field-of-view of the second camera 117 (e.g. a "YES" decision at the block 314), controlling a notification device to provide a notification to notify the person-of-interest 105 of their location within the estimated field-of-view 405 of the second camera 117.

In particular, FIG. 5 depicts the device 101 transmitting a command 501 to the mobile communication device 109 to provide a notification. FIG. 5 further depicts the mobile communication device 109 controlling the smart glasses 111 (e.g. assuming that the smart glasses 111 are in communication with the mobile communication device 109) to provide a visual notification 503 to the person-of-interest 105 to notify the person-of-interest 105 of their location within the estimated field-of-view 405 of the second camera 117. For example, as depicted, the visual notification 503 comprises text "A Camera Is Recording You". However, any suitable notification at the smart glasses 111, the mobile communication device 109, the device 101 and the vehicle 103, and the like, is within the scope of the present specification. For example, the lightbar 504 (and/or other light and/or array of lights at the vehicle 103) may be controlled according to a particular pattern, and the like to notify the person-of-interest 105 of their location within the estimated field-of-view 405 of the second camera 117.

FIG. 5 further depicts the system 100 with an EMS device 505 (e.g. an EMS server and/or an EMS memory) in communication with the device 101. As depicted, the device 101 is transmitting data 507 to the EMS device 505 comprising images from the first camera 102 (e.g. the image 401), and/or data and/or metadata associated with the images and/or the second camera 117 and/or the operating person 115, and the like. Such data 507 may be used to contact the operating person 115 to obtain images and/or video of the second camera 117 which captured the incident in which the person-of-interest 105 was involved. The data 507 may be encrypted and/or may be securely stored at the EMS device 505, for example in accordance with rules and/or regulations and/or policies associated with evidence.

Hence, provided herein is a device, system and method for notifying a person-of-interest of their location within an estimated field-of-view of a camera. The device, system and method of the present specification may automatically detect image taking/video recording of a first responder, and the like, and may and store and/or securely store images, video, and other data and/or metadata associated with a detected event as evidence into an EMS system for potential later review and action is needed In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An electronic device comprising:
a controller in communication with a first camera, the controller configured to:
identify a first responder in an area proximal one or more of the first camera and the electronic device, the first responder responding to a current incident;
receive images from the first camera;
process the images from the first camera to identify a second camera in the images located in the area proximal one or more of the first camera and the electronic device using one or more of: machine learning algorithms; video analytic algorithms; three-dimensional video analytic algorithms; and trained video analytic classifiers applied to the images from the first camera;
determine a location of the first responder;
determine, from the images from the first camera; a respective location of the second camera; a direction that the second camera is pointing in the images; an estimated field-of-view of the second camera; and a bystander, to the current incident, operating the second camera to acquire one or more of respective images and video of one or more of the current incident and the first responder,
determine, by comparing the location of the first responder and the respective location and the estimated field-of-view of the second camera, whether the first responder is located within the estimated field-of-view of the second camera; and,
in response to determining that the first responder is located within the estimated field-of-view of the second camera, control a notification device to provide a notification to notify the first responder of: the location of the first responder the estimated field-of-view of the second camera; and the direction of the second camera with respect to the location of the first responder.

2. The electronic device of claim 1, wherein the controller is further configured to determine the location of the first responder by one or more of:
determine the location of the first responder from the images received from the first camera;
receive the location of the first responder from a location-determining device associated with the first responder;
receive the location of the first responder from a Global Positioning System (GPS) device associated with the first responder;
determine the location of the first responder using one or more radio-frequency location determining processes; and
determine the location of the first responder using an RFID tracking device associated with the first responder.

3. The electronic device of claim 1, wherein the controller is further configured to determine whether the first responder is located within the estimated field-of-view of the second camera by:
determining, from the images, an orientation of the second camera with respect to the location of the first responder; and
determining that the orientation of the second camera is towards the first responder.

4. The electronic device of claim 1, wherein the controller is further configured to, in response to determining that the first responder is located within the estimated field-of-view of the second camera:

store, in a memory in communication with the controller, one or more of:
the images;
data associated with one or more of the images and the second camera; and
metadata associated with one or more of the images and the second camera.

5. The electronic device of claim 1, wherein the controller is further configured to:
in response to determining that the first responder is located within the estimated field-of-view of the second camera:
store, in a memory in communication with the controller, one or more of:
the images;
data associated with the bystander; and
metadata associated with the bystander.

6. The electronic device of claim 1, wherein the controller is further configured to:
determine that the first responder is responding to the current incident,
wherein determining that the first responder is located within the estimated field-of-view of the second camera, and controlling the notification device, in response to determining that the first responder is located within the estimated field-of-view of the second camera, occur in response to determining that the first responder is responding to the current incident.

7. The electronic device of claim 1, further comprising a communication unit, and wherein the notification device is located with the first responder, the controller being further configured to control the notification device to provide the notification by: transmitting, using the communication unit, a command to the notification device to provide the notification.

8. The electronic device of claim 1, wherein the notification device is local to the electronic device, and wherein the controller is further configured to control the notification device to provide the notification by: locally controlling the notification device to provide one or more of an audio notification and a visual notification to the first responder.

9. The electronic device of claim 1, wherein the controller is further configured to:
determine, from the images from the first camera, that one or more of the bystander and an additional bystander, is operating a communication device to capture information associated with the first responder, the information comprising one or more of textual information and voice information; and
store, in a memory, one or more of: an indication of the information being captured; and data identifying one or more of the bystander, and the additional bystander.

10. The electronic device of claim 1, wherein the controller is further configured to:
identify, from the images, a type the second camera; and
determine, from the type of the second camera, the estimated field-of-view of the second camera.

11. The electronic device of claim 1, wherein the controller is further configured to identify, from the images from the first camera, one or more of the first responder, the bystander operating the second camera, and whether the first responder is located within the estimated field-of-view of the second camera, using one or more of: the machine learning algorithms; the video analytic algorithms; the three-dimensional video analytic algorithms; and the trained video analytic classifiers applied to the images from the first camera.

12. A method comprising:
identifying, at an electronic device in communication with a first camera, a first responder in an area proximal one or more of the first camera and the electronic device, the first responder responding to a current incident;
receiving, at the electronic device, images from the first camera;
processing, at the electronic device, the images from the first camera to identify a second camera in the images located in the area proximal one or more of the first camera and the electronic device using one or more of: machine learning algorithms; video analytic algorithms; three-dimensional video analytic algorithms; and trained video analytic classifiers applied to the images;
determining, at the electronic device, a location of the first responder;
determining, at the electronic device, from the images from the first camera; a respective location of the second camera: a direction that the second camera is pointing in the images; an estimated field-of-view of the second camera; and a bystander, to the current incident, operating the second camera to acquire one or more of respective images and video of one or more of the current incident and the first responder;
determining, at the electronic device, by comparing the location of the first responder and the respective location and estimated field-of-view of the second camera, whether the first responder is located within the estimated field-of-view of the second camera; and,
in response to determining that the first responder is located within the estimated field-of-view of the second camera, controlling, at the electronic device, a notification device to provide a notification to notify the first responder of: their location within the estimated field-of-view of the second camera; and the direction of the second camera with respect to the location of the first responder.

13. The method of claim 12, wherein the determining the location of the first responder comprises one or more of:
determining the location of the first responder from the images received from the first camera;
receiving the location of the first responder from a location-determining device associated with the first responder;
receiving the location of the first responder from a Global Positioning System (GPS) device associated with the first responder;
determining the location of the first responder using one or more radio-frequency location determining processes; and
determining the location of the first responder using an RFID tracking device associated with the first responder.

14. The method of claim 12, wherein the determining whether the first responder is located within the estimated field-of-view of the second camera comprises one or more of:
determining, from the images, an orientation of the second camera with respect to the location of the first responder; and
determining that the orientation of the second camera is towards the first responder.

15. The method of claim 12, further comprising, in response to determining that the first responder is located within the estimated field-of-view of the second camera:

storing, in a memory in communication with the electronic device, one or more of:
the images;
data associated with one or more of the images and the second camera; and
metadata associated with one or more of the images and the second camera.

16. The method of claim 12, further comprising:
in response to determining that the first responder is located within the estimated field-of-view of the second camera:
storing, in a memory in communication with the controller, one or more of:
the images;
data associated with the bystander; and
metadata associated with the bystander.

17. The method of claim 12, further comprising:
determining whether the first responder is associated with a current incident,
wherein the determining whether the first responder is located within the estimated field-of-view of the second camera, and the controlling the notification device, in response to determining that the first responder is located within the estimated field-of-view of the second camera, occur in response to determining that first responder is associated with the current incident.

18. The method of claim 12, wherein the notification device is located with the first responder, the controlling the notification device to provide the notification comprises: transmitting, using a communication unit of the electronic device, a command to the notification device to provide the notification.

19. The method of claim 12, wherein notification device is located with the electronic device comprises the, and the controlling the notification device to provide the notification comprises: locally controlling, at the notification device, the notification device to provide one or more of an audio notification and a visual notification to the first responder.

20. The method of claim 12, further comprising:
determining, from the images from the first camera, that one or more of bystander, and an additional bystander, is operating a communication device to capture information associated with the first responder, the information comprising one or more of textual information and voice information; and
storing, in a memory, one or more of: an indication of the information being captured; and data identifying one more of the bystander, and the additional bystander.

* * * * *